United States Patent
Ueda et al.

(10) Patent No.: US 6,704,258 B2
(45) Date of Patent: Mar. 9, 2004

(54) TRACKING ERROR SIGNAL DETECTOR

(75) Inventors: Eiji Ueda, Yawata (JP); Yasumori Hino, Ikoma (JP); Takashi Inoue, Osaka (JP); Hideki Ohyama, Tamana-gun (JP); Kiyokazu Hashimoto, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 24 days.

(21) Appl. No.: 10/148,529

(22) PCT Filed: Sep. 25, 2001

(86) PCT No.: PCT/JP01/08324
§ 371 (c)(1),
(2), (4) Date: May 29, 2002

(87) PCT Pub. No.: WO02/29795
PCT Pub. Date: Apr. 11, 2002

(65) Prior Publication Data
US 2002/0181351 A1 Dec. 5, 2002

(30) Foreign Application Priority Data
Sep. 29, 2000 (JP) ........................................ 2000-300493

(51) Int. Cl.[7] ................................................ G11B 7/00
(52) U.S. Cl. .................................. 369/44.34; 369/44.13
(58) Field of Search .......................... 369/44.27, 44.28, 369/44.13, 44.29, 275.3, 44.34

(56) References Cited

U.S. PATENT DOCUMENTS 6,118,752 A * 9/2000 Miyagawa et al. ...... 369/275.3

FOREIGN PATENT DOCUMENTS

| JP | 63-20726 | 1/1988 |
| JP | 1-159835 | 6/1989 |
| JP | 4-74322 | 3/1992 |
| JP | 5-144046 | 6/1993 |
| JP | 6-60408 | 3/1994 |
| JP | 6-68505 | 3/1994 |

* cited by examiner

*Primary Examiner*—Nabil Hindi
(74) *Attorney, Agent, or Firm*—Merchant & Gould P.C.

(57) ABSTRACT

A tracking error signal detector includes: a photodetector (103) for detecting reflected light from an optical recording medium having a servo area provided with a first wobble mark and a second wobble mark; an amplifier (104) for producing a summation signal of the reflected light; a sampling portion (105) for sampling the summation signal; a first arithmetic portion (106) for calculating an extremum of the summation signal in the vicinity of reproduction timing for each of the first and second wobble marks from the sampling values so as to produce first and second extremums; and a second arithmetic portion (107) for producing a tracking error signal that corresponds to a difference between the first and second extremum. The tracking error signal detector can produce a high-accuracy tracking error signal even if sampling is performed with an asynchronous clock relative to the summation signal.

11 Claims, 14 Drawing Sheets

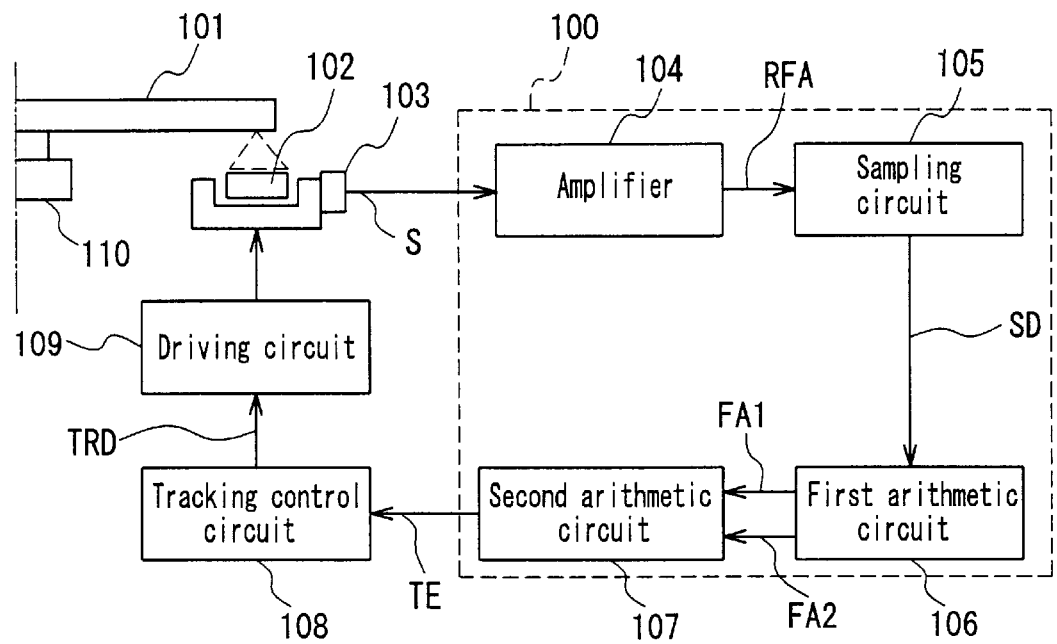
F I G. 1
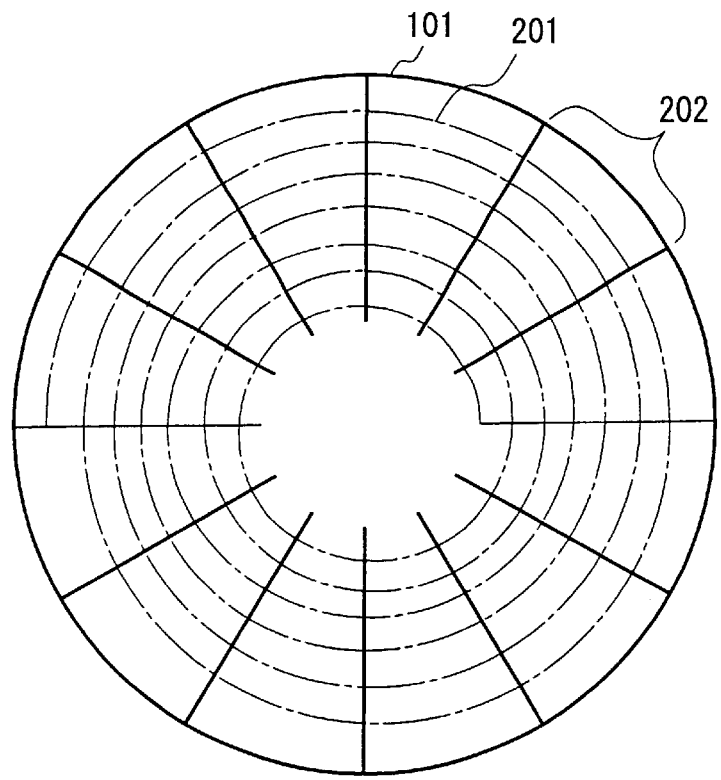
F I G. 2

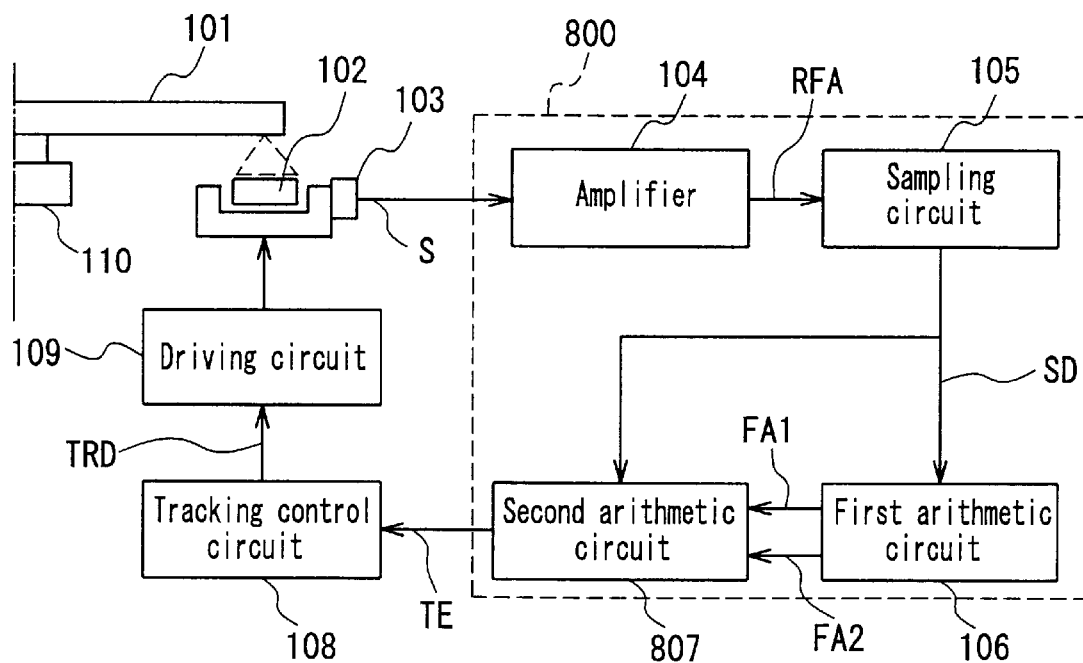
F I G. 8

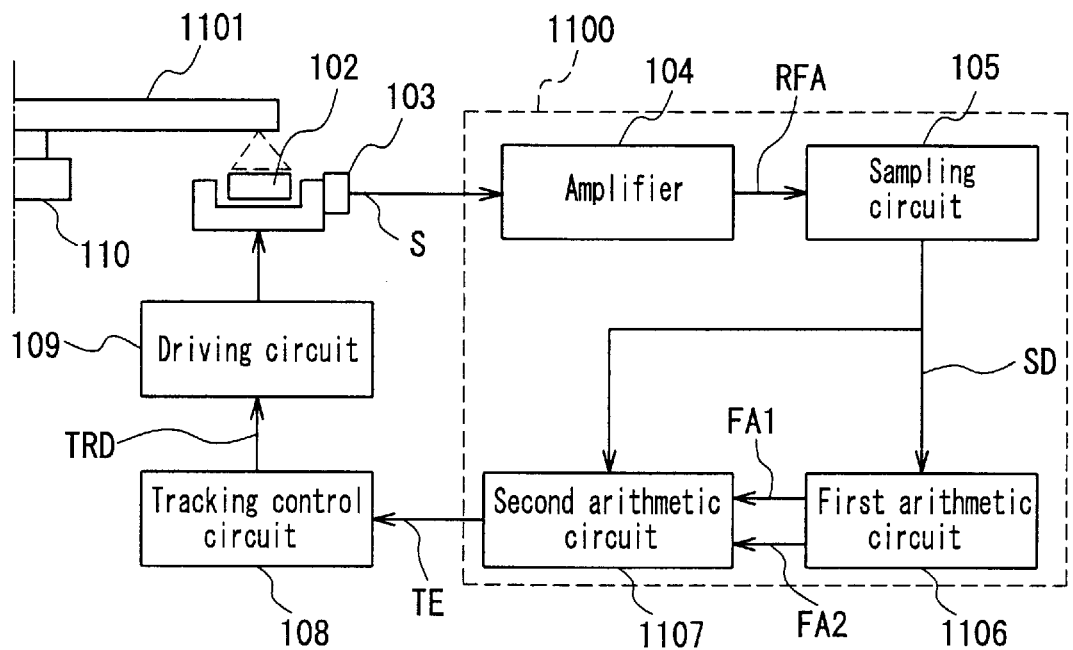
F I G. 1 1

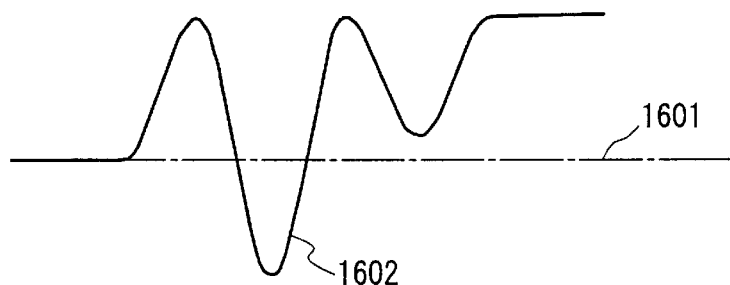
F I G. 1 6
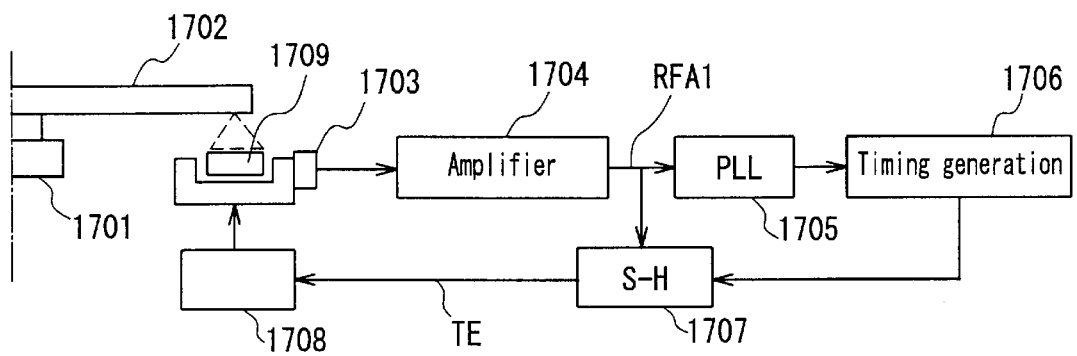
F I G. 1 7
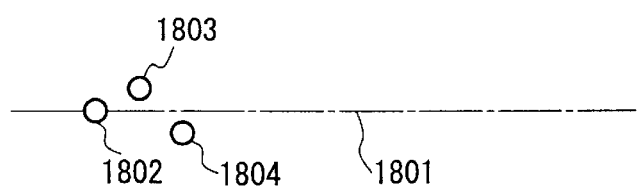
F I G. 1 8

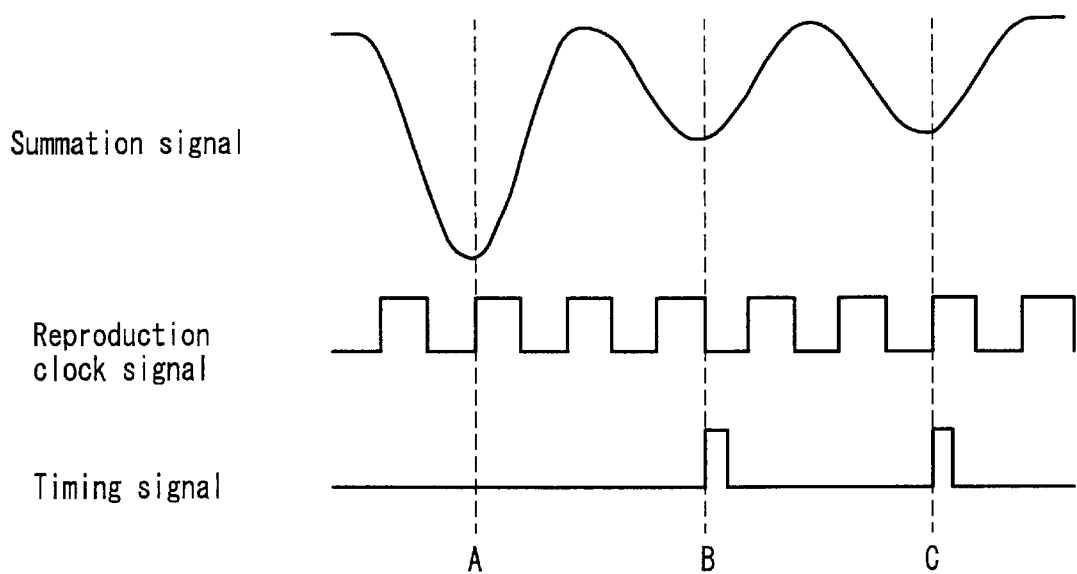
F I G. 1 9

TRACKING ERROR SIGNAL DETECTOR

TECHNICAL FIELD

The present invention relates to a tracking error signal detector that is used in an optical disk apparatus for recording/reproducing data optically.

BACKGROUND ART

In recent years, the applicability of optical disk apparatuses for recording/reproducing information has increased significantly. An example of a conventional tracking error signal detector used in the optical disk apparatuses will be described below by referring to the drawings.

FIG. 17 shows the configuration of an optical disk apparatus that includes a conventional tracking error signal detector. The tracking error signal detector includes an amplifier 1704, a PLL circuit 1705, a timing generation circuit 1706, and a sample-hold (S-H) circuit 1707. Reference numeral 1708 denotes a tracking control device that drives an objective lens 1709 via a tracking actuator based on a tracking error signal TE output from the tracking error signal detector.

In FIG. 17, light reflected from an optical recording medium 1702 that is rotated by a spindle motor 1701 is detected by a photodetector 1703. A detection signal of the photodetector 1703 is input to the amplifier 1704, which then produces a summation signal RFA1. The summation signal RFA1 is input to the PLL circuit 1705 and the S-H circuit 1707.

FIG. 18 shows the arrangement of marks formed on the optical recording medium 1702. In FIG. 18, a horizontal axis represents the circumferential direction of the optical recording medium 1702. A clock mark 1802 is located on an imaginary track centerline 1801. A first wobble mark 1803 is located at a certain distance away from the track centerline 1801 on the outer circumference side, while a second wobble mark 1804 is located at a certain distance away from the track centerline 1801 on the inner circumference side. When a light spot passes along the track centerline 1801, an amount of light reflected from the first wobble mark 1803 is equal to that from the second wobble mark 1804. When the light spot passes along the outer circumference side of the track centerline, the amount of light reflected from the second wobble mark 1804 is smaller than that from the first wobble mark 1803. When the light spot passes along the inner circumference side of the track centerline, the amount of light reflected from the second wobble mark 1804 is larger than that from the first wobble mark 1803. By comparing the reflected light from the first wobble mark 1803 with that from the second wobble mark 1804, a tracking error signal, which indicates the deviation of a light spot from the track centerline 1801, can be detected.

The PLL circuit 1705 in FIG. 17 produces a reproduction clock signal in synchronization with light reflected from the clock mark 1802. The reproduction clock signal is input to the timing generation circuit 1706, which then outputs a timing signal that indicates the reproduction timing for each of the first and second wobble marks 1803, 1804. The S-H circuit 1707 samples and holds the summation signal RFA1 in response to the timing signal, subtracts the summation signal RFA corresponding to the second wobble mark 1804 from that corresponding to the first wobble mark 1803, and outputs the resultant value as a tracking error signal TE.

FIG. 19 shows a waveform in each portion of the tracking error signal detector in FIG. 17. In FIG. 19, a horizontal axis represents time. The summation signal RFA1 from the amplifier 1704 has a reproduction waveform that corresponds to the clock mark 1802, the first wobble mark 1803, and the second wobble mark 1804. The PLL circuit 1705 generates the reproduction clock signal in synchronization with the clock mark 1802 (time A). The timing generation circuit 1706 generates the timing signal in response to the reproduction clock signal from the PLL circuit 1705. The S-H circuit 1707 samples and holds the summation signal RFA1 in accordance with the timing signal. In an example shown in FIG. 19, the summation signal RFA is sampled and held at time B and time C. The sampling value at time B corresponds to the first wobble mark 1803 and the sampling value at time C corresponds to the second wobble mark 1804.

The tracking error signal TE output from the tracking error signal detector having the above configuration is input to the tracking control device 1708 in FIG. 17. The tracking control device 1708 performs a predetermined control operation and drives the tracking actuator. The tracking actuator drives the objective lens 1709. In this manner, a light spot is controlled so as to be on the track centerline 1801. The tracking error signal detector as described above is disclosed, e.g., in JP 6(1994)-60408 A.

In the above configuration, however, it is difficult for the PLL circuit to be pulled in, e.g., when the rotation rate of the optical recording medium changes greatly or sharply. If the PLL circuit is not pulled in, the summation signal RFA1 does not synchronize with the clock of the PLL circuit. Consequently, the timing signal of the timing generation circuit also becomes asynchronous with the summation signal RFA1.

When the summation signal RFA1 does not synchronize with the timing signal, the summation signal RFA1 that corresponds to the first and second wobble marks cannot be detected correctly, making it impossible to detect an accurate tracking error signal TE. This increases tracking errors, which lead to inaccurate recording/reproducing operations on the optical recording medium.

DISCLOSURE OF INVENTION

Therefore, with the foregoing in mind, it is an object of the present invention to provide a tracking error signal detector that can produce a high-accuracy tracking error signal even if a summation signal is sampled at asynchronous timing.

To achieve the above object, a tracking error signal detector of the present invention includes a photodetector, an amplifier, a sampling portion, a first arithmetic portion, and a second arithmetic portion. The photodetector detects reflected light from an optical recording medium including a servo area provided with a first wobble mark and a second wobble mark. The amplifier produces a summation signal of the reflected light from a detection signal of the photodetector. The sampling portion samples the summation signal. The first arithmetic portion calculates extremum of the summation signal in the vicinity of reproduction timing for each of the first wobble mark and the second wobble mark from sampling values produced by the sampling portion so as to produce a first extremum and a second extremum. The second arithmetic portion produces a tracking error signal that corresponds to a difference between the first extremum and the second extremum.

This configuration detects the extremum of each reproduction wobble mark by operations with the sampling values of the summation signal in the vicinity of the wobble mark.

Therefore, an optimum value always can be obtained, resulting in a high-accuracy tracking error signal.

The first arithmetic portion may include a maximum/minimum sampling value detecting portion, a first estimating portion, and a second estimating portion. The maximum/minimum sampling value detecting portion produces a maximum/minimum of the sampling values in the vicinity of reproduction timing for each of the first wobble mark and the second wobble mark. The first estimating portion estimates a timing of a relative maximum/minimum of the summation signal in the vicinity of reproduction timing for each of the first wobble mark and the second wobble mark by using the maximum/minimum sampling value and its preceding and following sampling values. The second estimating portion estimates a relative maximum/minimum of the summation signal in the vicinity of reproduction timing for each of the first wobble mark and the second wobble mark by using the maximum/minimum sampling value, its preceding and following sampling values, and the timing of the relative maximum/minimum from the first estimating portion.

The first arithmetic portion may include a maximum/minimum sampling value detecting portion and a third estimating portion. The maximum/minimum detecting portion produces a maximum/minimum of the sampling values in the vicinity of reproduction timing for each of the first wobble mark and the second wobble mark. The third estimating portion estimates a relative maximum/minimum of the summation signal in the vicinity of reproduction timing for each of the first wobble mark and the second wobble mark by using the maximum/minimum sampling value and its preceding and following sampling values.

It is preferable that the second arithmetic portion includes an output selecting portion. The output selecting portion selects one of a value corresponding to the difference between the first extremum and the second extremum and a tracking error signal detected from the preceding servo area in accordance with the state of the sampling values so as to output the tracking error signal.

It is preferable that the second arithmetic portion includes a comparing portion and an output selecting portion. The comparing portion compares the first extremum and the second extremum with a sampling value at predetermined timing. The output selecting portion selects one of a value corresponding to the difference between the first extremum and the second extremum and a tracking error signal detected from the preceding servo area in accordance with the comparison result of the comparing portion so as to output the tracking error signal.

It is preferable that the second arithmetic portion includes a portion for comparing sampling values between marks and an output selecting portion. The portion for comparing sampling values between marks compares the sampling values of the summation signal in the vicinity of reproduction timing between the first wobble mark and the second wobble mark with a predetermined value. The output selecting portion selects one of a value corresponding to the difference between the first extremum and the second extremum and a tracking error signal detected from the preceding servo area in accordance with the comparison result of the portion for comparing sampling values between marks so as to output the tracking error signal.

It is preferable that the output selecting portion changes a selecting/outputting operation in accordance with the operating state of tracking control.

It is preferable that the second arithmetic portion selects one of a value corresponding to the difference between the first extremum and the second extremum and a tracking error signal detected from the preceding servo area in accordance with directions in which the first extremum and the second extremum change during the tracking control operation so as to output the tracking error signal.

BRIEF DESCRIPTION OF DRAWINGS

FIG. 1 is a block diagram showing the configuration of an optical disk apparatus that includes a tracking error signal detector of Embodiment 1 of the present invention.

FIG. 2 is a diagram showing the configuration of an optical recording medium with which a tracking error signal detector of the present invention is used.

FIG. 8 is a block diagram showing the configuration of an optical disk apparatus that includes a tracking error signal detector of Embodiment 3 of the present invention.

FIG. 11 is a block diagram showing the configuration of an optical disk apparatus that includes a tracking error signal detector of Embodiment 4 of the present invention.

FIG. 16 is a waveform diagram illustrating the operation of a tracking error signal detector of Embodiment 4.

FIG. 17 is a block diagram showing the configuration of a conventional tracking error signal detector.

FIG. 18 is a diagram showing the configuration of segments of an optical recording medium with which a conventional tracking error signal detector is used.

FIG. 19 is a waveform diagram illustrating the operation of a conventional tracking error signal detector.

BEST MODE FOR CARRYING OUT THE INVENTION

EMBODIMENT 1

Figure 3:
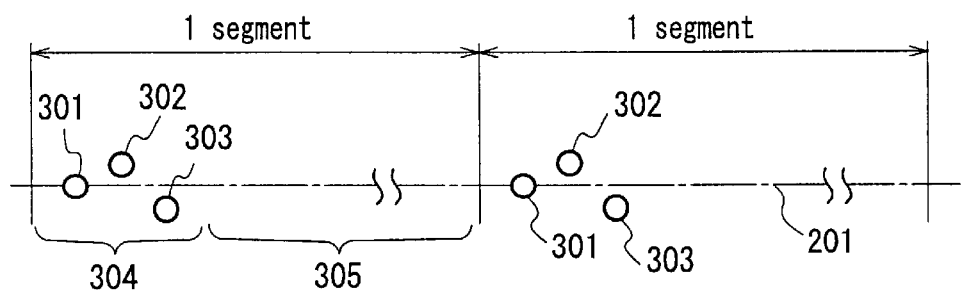
FIG. 3 is a diagram showing the configuration of segments of the optical recording medium in FIG. 2.

FIG. 1 shows the configuration of an optical disk apparatus including a tracking error signal detector 100 of Embodiment 1. In FIG. 1, light reflected from an optical recording medium 101 that is rotated by a spindle motor 110 is detected by a photodetector 103 through an objective lens 102. A detection signal S of the photodetector 103 is input to an amplifier 104. The amplifier 104, a sampling circuit 105, a first arithmetic circuit 106 and a second arithmetic circuit 107 constitute the tracking error signal detector 100. A tracking error signal TE generated by the tracking error signal detector 100 is output from the second arithmetic circuit 107.

Reference numeral 108 denotes a tracking control circuit, which generates a tracking drive signal TRD based on the tracking error signal TE output from the tracking error signal detector 100 and outputs it to a driving circuit 109. The driving circuit 109 drives the objective lens 102 based on the tracking drive signal TRD.

The optical recording medium 101 in FIG. 1 will be described below by referring to FIGS. 2 and 3. FIG. 2 shows specifically the whole configuration of the optical recording medium 101. The disk-shaped optical recording medium 101 has an imaginary track centerline 201 in spiral fashion, which is illustrated partially in FIG. 2. A plurality of segments 202 are formed radially on the optical recording medium 101. For convenience, FIG. 2 shows twelve segments 202 that are arranged in the circumferential direction. Actually, however, 500 to 3000 segments 202 are provided.

FIG. 3 shows the arrangement of marks in each of the segments 202. One segment is divided into two areas: a servo area 304 formed in the beginning of the segment and a data area 305 formed in the rest. A clock mark 301, a first wobble mark 302, and a second wobble mark 303 are arranged in the servo area 304. The track centerline 201 is an imaginary line, along which a light spot should travel when data recorded on the optical recording medium 101 are read. The clock mark 301 is formed on the track centerline 201 and used to generate a synchronizing clock signal for reproducing the wobble marks 302, 303 and information recorded on the data area 305. The first and second wobble marks 302, 303 are used to detect a tracking error signal and displaced from each other on the opposite sides of the track centerline 201.

The amplifier 104 in FIG. 1 processes the detection signal S from the photodetector 103 and outputs a summation signal RFA that corresponds to the amount of light reflected from the optical recording medium 101. The value of the summation signal RFA that corresponds to the region of the optical recording medium 101 where no mark is formed becomes large. On the other hand, the value of the summation signal RFA that corresponds to the region of the optical recording medium 101 where a mark is formed becomes small because the reflected light is dispersed under the influence of the mark, and thus the amount of light detected by the photodetector 103 is reduced. Therefore, the state of marks on the optical recording medium 101 can be detected with the summation signal RFA.

The summation signal RFA is input to the sampling circuit 105. The sampling circuit 105 samples the summation signal RFA at a predetermined sampling frequency. The sampling circuit 105 includes a sample-hold circuit and an A/D (analog-to-digital) converter. The sampling intervals of the sampling circuit 105 are set to a value smaller than one third of the time required for a light spot to pass through the clock mark 301, the first wobble mark 302, or the second wobble mark 303.

Figure 4:
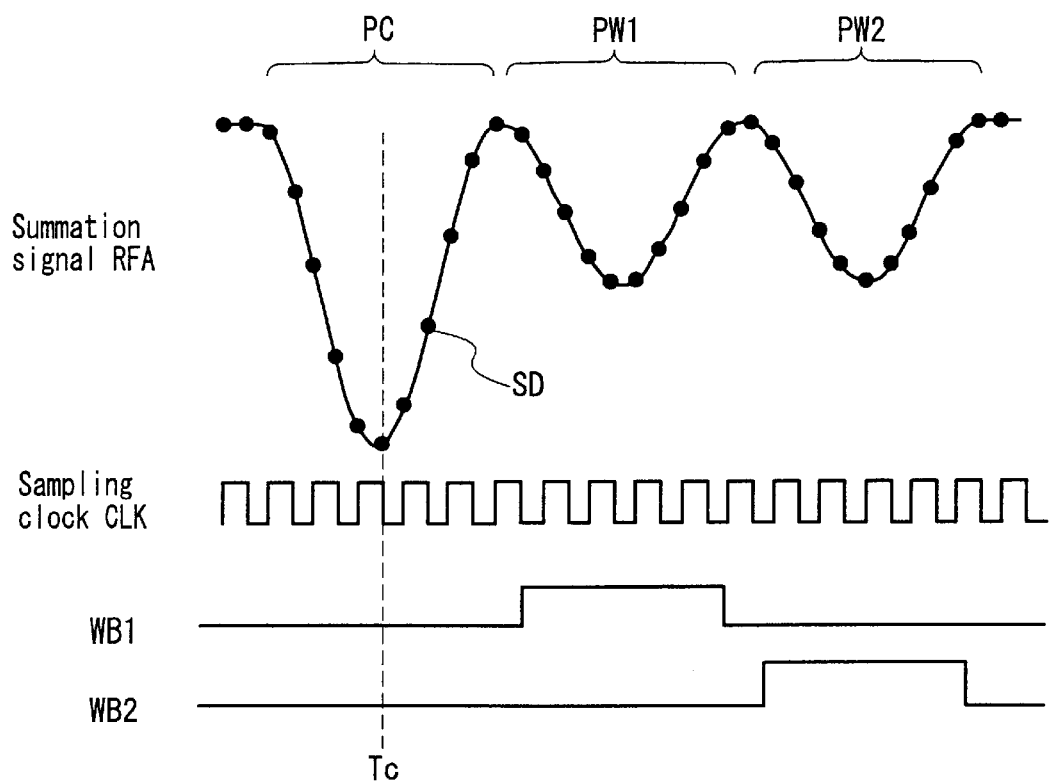
FIG. 4 is a waveform diagram illustrating the operation of a tracking error signal detector of Embodiment 1.

FIG. 4 shows the summation signal RFA output from the amplifier 104 and sampling values SD. The sampling circuit 105 samples the summation signal RFA with a predetermined sampling clock CLK to produce the sampling values SD. In FIG. 4, the sampling values SD in a section PC correspond to the clock mark 301, those in a section PW1 correspond to the first wobble mark 302, and those in a section PW2 correspond to the second wobble mark 303.

As can be seen from FIG. 4, a minimum of the sampling values SD in the section PW1 differs from a relative minimum of the summation signal RFA. On the other hand, a minimum of the sampling values SD in the section PW2 corresponds to a relative minimum of the summation signal RFA. Therefore, calculating the tracking error signal TE from the two minimum sampling values causes a large error.

As will be described in the following, the apparatus shown in FIG. 1 can produce a high-accuracy tracking error signal TE from the sampling values SD by operations of the first and second arithmetic circuits 106, 107.

The sampling values SD output from the sampling circuit 105 are input to the first arithmetic circuit 106. The first arithmetic circuit 106 detects two values, FA1 and FA2, from the input sampling values SD. FA1 corresponds to the relative minimum of the summation signal RFA for the first wobble mark 302, and FA2 corresponds to the relative minimum of the summation signal RFA for the second wobble mark 303. The first arithmetic circuit 106 includes a minimum sampling value detecting portion, a first estimating portion, and a second estimating portion. Though these portions are not shown in the drawing, they perform the main operation among various operations to be described below.

The minimum sampling value detecting portion detects a minimum of the sampling values SD in the vicinity of reproduction timing for each of the first and second wobble marks 302, 303. The first estimating portion estimates a timing of a relative minimum of the summation signal RFA in the vicinity of reproduction timing for each of the first and second wobble marks 302, 303 by using the minimum sampling value and its preceding and following sampling values. The second estimating portion estimates a relative minimum of the summation signal RFA in the vicinity of reproduction timing for each of the first and second wobble marks 302, 303 by using the minimum sampling value, its preceding and following sampling values, and the timing of the relative minimum from the first estimating portion.

Figure 5:
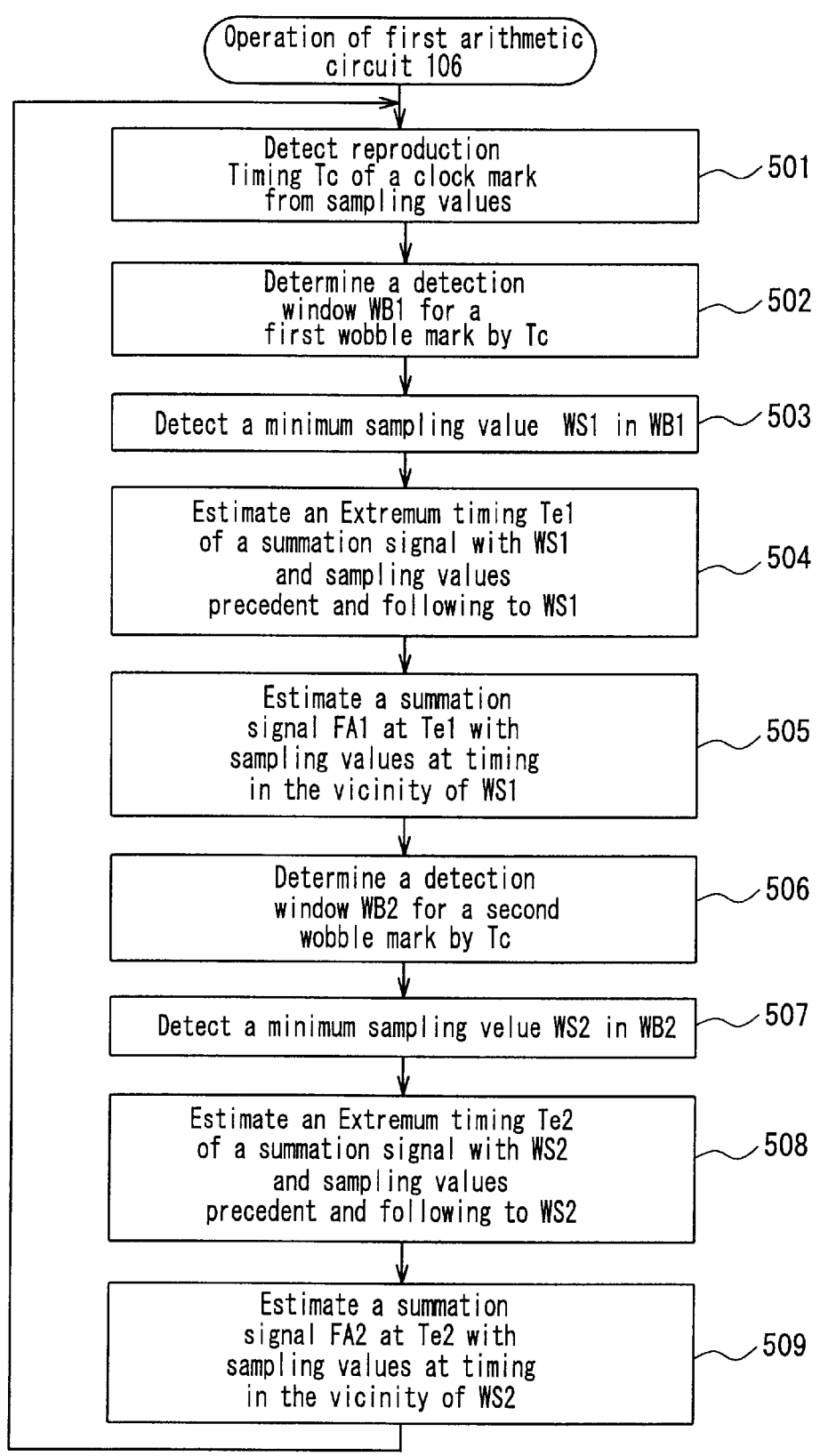
FIG. 5 is a flow chart illustrating the operation of a first arithmetic circuit that constitutes a tracking error signal detector of Embodiment 1.

FIG. 5 shows a specific operation flow of the first arithmetic circuit 106. The specific operation of the first arithmetic circuit 106 will be described below by referring to FIGS. 5 and 4.

A process 501 operates to detect a reproduction timing Tc (see FIG. 4) of the clock mark 301 in FIG. 3 from the sampling values SD. The detection is performed in the following manner. Since no mark is present in a predetermined section ahead of the clock mark 301 on the optical recording medium 101, the summation signal RFA is kept substantially constant during a predetermined period of time. When a light spot passes over the clock mark 301, the summation signal RFA changes greatly. Therefore, the summation signal RFA that corresponds to the clock mark 301 can be detected by using this change. Moreover, a minimum of the sampling values SD in the vicinity of the summation signal RFA corresponding to the clock mark 301 also can be detected easily. The timing of this minimum is represented by Tc.

A process 502 operates to determine a detection window WB1 in the vicinity of reproduction timing of the first wobble mark 302 by using the reproduction timing Tc of the clock mark 301 (see the signal WB1 in FIG. 4). The detection window WB1 may be set so as to include the relative minimum of the summation signal RFA that corresponds to the first wobble mark 302.

A process 503 operates to detect a minimum WS1 of the sampling values SD in the detection window WB1. The minimum WS1 can be detected easily by a comparison operation.

A process 504 operates to estimate an extremum timing Te1 of the summation signal RFA by using respective sampling values SD precedent and following to the minimum WS1. Specifically, Te1 is given by $$Te1=Tw1+(WS1M1-WS1P1)/(WS1M1+WS1P1-2\times WS1)\times(T/2)$$

where WS1M1 and WS1P1 are sampling values at respective timings immediately before and after the minimum WS1, Tw1 is a sample timing of the minimum WS1, and T is the sampling interval of the sampling circuit 105.

This equation uses three sampling values WS1M1, WS1, and WS1P1 to approximate the summation signal RFA by a quadratic function, thus calculating the extremum timing Te1.

A process 505 operates to estimate the summation signal FA1 at the extremum timing Te1 by using the sampling values at timings in the vicinity of the minimum WS1. That is, each of the sampling values SD at timings in the vicinity of WS1 are multiplied by a coefficient defined by Te1−Tw1, which then are summed up so as to give the summation signal FA1 at the extremum timing Te1. The coefficient defined by Te1−Tw1 can be calculated by $F(x)=\sin(x)/x$ (sinc function).

A process 506 operates to determine a detection window WB2 in the vicinity of reproduction timing of the second wobble mark 303 by using the reproduction timing Tc of the clock mark 301 (see the signal WB2 in FIG. 4). The detection window WB2 may be set so as to include the relative minimum of the summation signal RFA that corresponds to the second wobble mark 303.

A process 507 operates to detect a minimum WS2 of the sampling values SD in the detection window WB2. The minimum WS2 can be detected easily by a comparison operation.

A process 508 operates to estimate an extremum timing Te2 of the summation signal RFA by using respective sampling values SD precedent and following to the minimum WS2. Specifically, Te2 is given by $$Te2=Tw2+(WS2M1-WS2P1)/(WS2M1+WS2P1-2\times WS2)\times(T/2)$$

where WS2M1 and WS2P1 are respective sampling values immediately before and after the minimum WS2, Tw2 is sample timing of the minimum WS2, and T is the sampling intervals of the sampling circuit 105.

This equation uses three sampling values WS2M1, WS2, and WS2P1 to approximate the summation signal RFA by a quadratic function, thus calculating the extremum timing Te2.

A process 509 operates to estimate the summation signal FA2 at the extremum timing Te2 by using the sampling values at timing in the vicinity of the minimum WS2. In other words, each of the sampling values SD at timings in the vicinity of WS2 are multiplied by a coefficient defined by Te2−Tw2, which then are summed up so as to give the summation signal FA2 at the extremum timing Te2. The coefficient defined by Te2−Tw2 can be calculated by $F(x)=\sin(x)/x$ (sinc function).

As clearly understood from the above description, the processes 503 and 507 correspond to the functions of the minimum sampling value detecting portion, the processes 504 and 508 correspond to the functions of the first estimating portion, and the processes 505 and 509 correspond to the functions of the second estimating portion.

In this manner, the first arithmetic circuit 106 produces FA1 that corresponds to the relative minimum of the summation signal RFA for the first wobble mark 302 and FA2 that corresponds to the relative minimum of the summation signal RFA for the second wobble mark 303 from the input sampling values SD by performing interpolation.

The second arithmetic circuit 107 in FIG. 1 receives FA1 and FA2 that are output from the first arithmetic circuit 106 and generates the tracking error signal TE that corresponds to a difference between the two values. That is, it calculates TE=FA1−FA2.

As described above, the tracking error signal detector 100 can function with the photodetector 103, the amplifier 104, the sampling circuit 105, the first arithmetic circuit 106, and the second arithmetic circuit 107.

The tracking control circuit 108 performs, e.g., predetermined phase compensation with respect to the tracking error signal TE from the second arithmetic circuit 107 and outputs the tracking drive signal TRD. The driving circuit 109 supplies electric power to a tracking actuator based on the tracking drive signal TRD from the tracking control circuit 108. The tracking actuator drives the objective lens 102. Thus, the tracking error signal detector 100, the tracking control circuit 108, and the driving circuit 109 constitute a tracking control device, which performs tracking control so that a light spot is positioned on the track centerline 201 of the optical recording medium 101.

The tracking error signal detector 100 having the above configuration can eliminate the need for synchronization between the summation signal RFA of the amplifier 104 and the sample timing of the sampling circuit 105. Moreover, a high-accuracy tracking error signal TE can be provided by the interpolation of the first arithmetic circuit 106.

In particular, since this embodiment allows the sampling intervals of the sampling circuit 105 to be set to a value smaller than one third of the time required for a light spot to pass through the clock mark 301, the first wobble mark 302, or the second wobble mark 303, the summation signal RFA of the amplifier 104 that corresponds to the mark can be detected reliably, thereby ensuring the accuracy of a tracking error signal.

As described above, the tracking error signal detector of this embodiment can provide a high-accuracy tracking control device.

In this embodiment, the relative minimum of the summation signal RFA is detected. However, the maximum value should be detected depending on the polarity of the summation signal RFA. Therefore, in that case the minimum sampling value detecting portion should be replaced with a maximum sampling value detecting portion. In such a case, though the equations for determining the extremum FA1, FA2 should be modified in accordance with the summation signal RFA, the same effects are obtained. This explanation applies equally to the following embodiments.

The first arithmetic circuit performs the interpolation by using the sinc function. However, the interpolation is not limited thereto, and various interpolations, such as spline interpolation, first-order interpolation and second-order interpolation, can be employed.

EMBODIMENT 2

Figure 6:
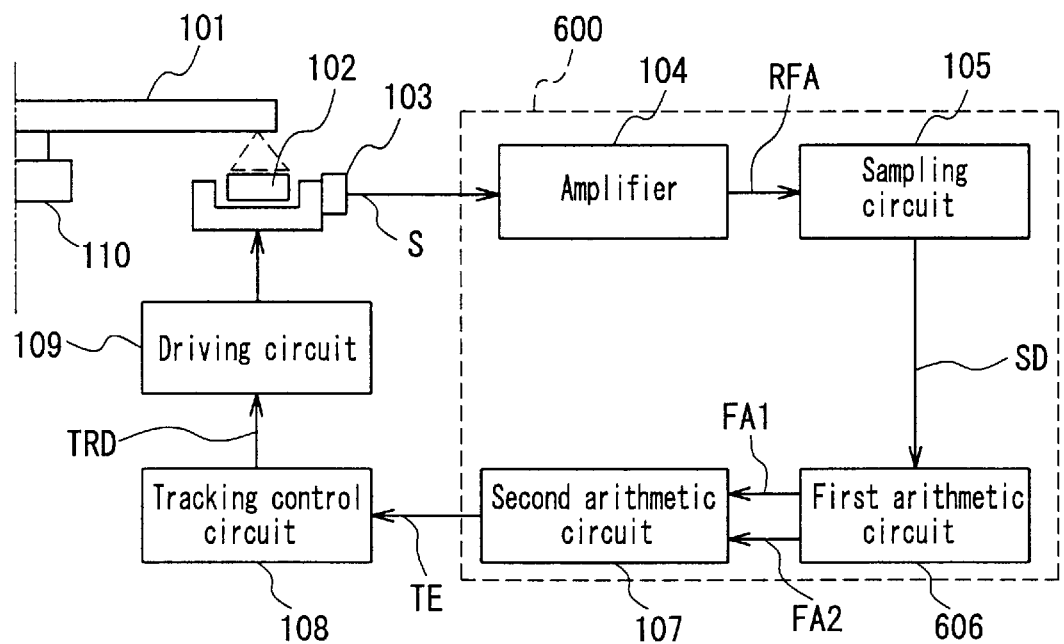
FIG. 6 is a block diagram showing the configuration of an optical disk apparatus that includes a tracking error signal detector of Embodiment 2 of the present invention.

FIG. 6 shows the configuration of an optical disk apparatus including a tracking error signal detector 600 of Embodiment 2. In this embodiment, the tracking error signal detector 600 has the same configuration as that in Embodiment 1 except for a first arithmetic circuit 606. Therefore, an explanation of the whole apparatus will not be repeated.

The first arithmetic circuit 606 detects two values, FA1 and FA2, from input sampling values SD. FA1 corresponds to the relative minimum of a summation signal RFA for a first wobble mark 302, and FA2 corresponds to the relative minimum of the summation signal RFA for a second wobble mark 303.

The first arithmetic circuit 606 includes a minimum sampling value detecting portion and a third estimating portion. Though these portions are not shown in the drawing, they perform the main operation among various operations to be described in the following. The minimum sampling value detecting portion detects a minimum of the sampling values SD in the vicinity of reproduction timing for each of the first and second wobble marks 302, 303. The third estimating portion estimates a relative minimum of the summation signal RFA in the vicinity of reproduction timing for each of the first and second wobble marks 302, 303 by using the minimum sampling value and its preceding and following sampling values.

Figure 7:
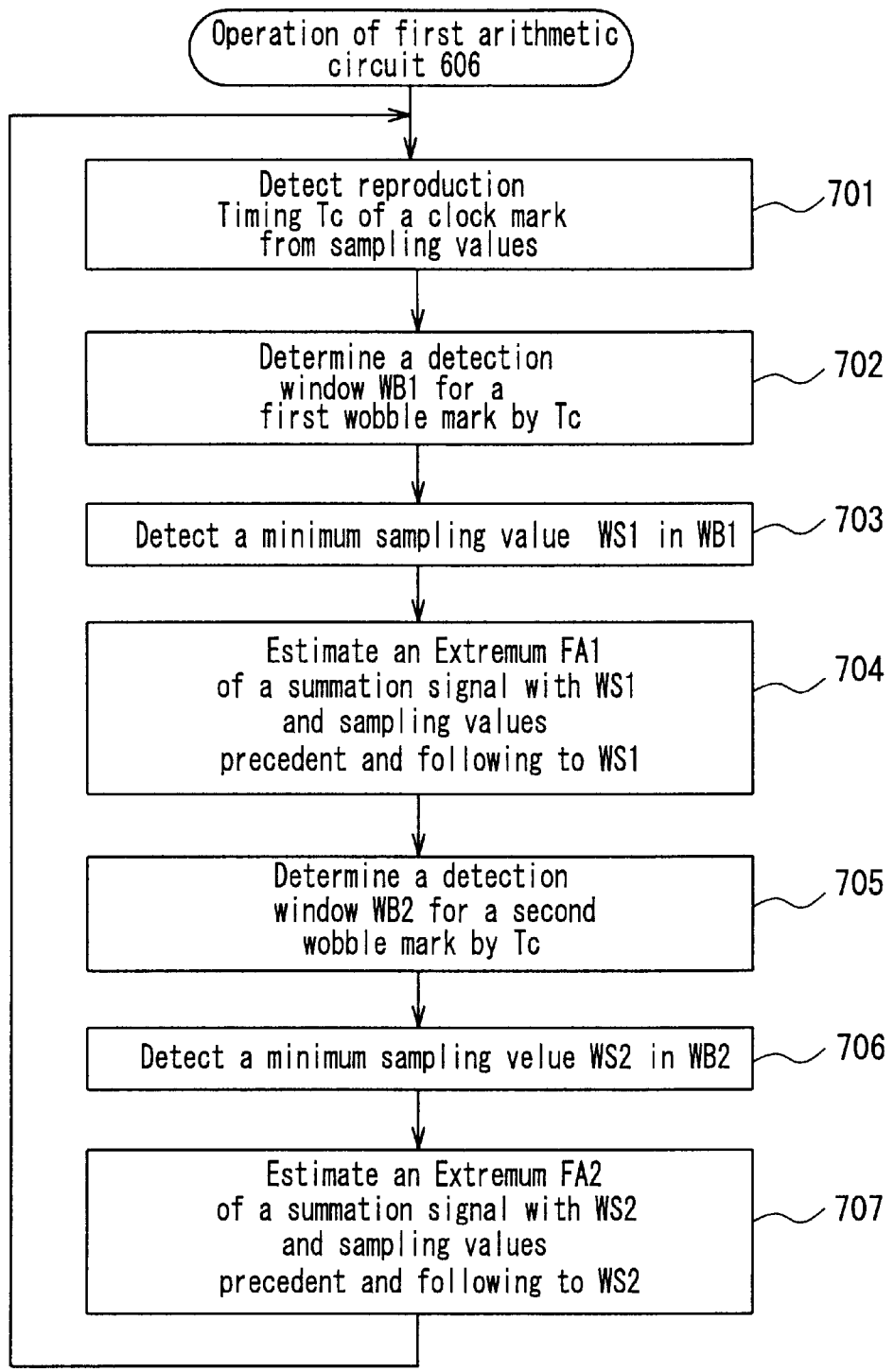
FIG. 7 is a flow chart illustrating the operation of a first arithmetic circuit that constitutes a tracking error signal detector of Embodiment 2.

FIG. 7 shows a specific operation flow of the first arithmetic circuit 606. The specific operation of the first arithmetic circuit 606 will be described below by referring to FIGS. 7, 3 and 4.

A process 701 in FIG. 7 operates to detect a reproduction timing Tc (see FIG. 4) of the clock mark 301 in FIG. 3 from the sampling values SD. The detection is performed in the same manner as that in Embodiment 1. Since no mark is present in a predetermined section ahead of the clock mark 301 on the optical recording medium 101, the summation signal RFA is kept substantially constant during a predetermined period of time. When a light spot passes on the clock mark 301, the summation signal RFA changes greatly. Therefore, the summation signal RFA that corresponds to the clock mark 301 can be detected by using this change. Moreover, a minimum of the sampling values SD in the vicinity of the summation signal RFA corresponding to the clock mark 301 also can be detected easily. The timing of this minimum is represented by Tc.

A process 702 operates to determine a detection window WB1 in the vicinity of reproduction timing of the first wobble mark 302 by using the reproduction timing Tc of the clock mark. The detection window WB1 may be set so as to include the relative minimum of the summation signal RFA that corresponds to the first wobble mark 302.

A process 703 operates to detect a minimum WS1 of the sampling values SD in the detection window WB1. The minimum WS1 can be detected easily by a comparison operation.

A process 704 operates to calculate the extremum FA1 of the summation signal RFA by using the preceding and the following sampling values SD of the minimum WS1. Specifically, FA1 is given by $$FA1 = WS1 - k \times ABS(WS1M1 - WS1P1)$$

where ABS(x) is the absolute value of x, WS1M1 and WS1P1 are respective sampling values immediately before and after the minimum WS1, and k is a predetermined constant. Here, k is a positive real number of not more than 0.2, and preferably 0.11.

A process 705 operates to determine a detection window WB2 in the vicinity of reproduction timing of the second wobble mark 303 by using the reproduction timing Tc of the clock mark. The detection window WB2 may be set so as to include the relative minimum of the summation signal RFA that corresponds to the second wobble mark 303.

A process 706 operates to detect a minimum WS2 of the sampling values SD in the detection window WB2. The minimum WS2 can be detected easily by a comparison operation.

A process 707 operates to calculate the extremum FA2 of the summation signal RFA by using respective sampling values SD precedent and following to the minimum WS2. Specifically, FA2 is given by $$FA2 = WS2 - k \times ABS(WS2M1 - WS2P1)$$

where ABS(x) is the absolute value of x, WS2M1 and WS2P1 are respective sampling values immediately before and after the minimum WS2, and k is a predetermined constant. Here, k is a positive real number of not more than 0.3, and preferably 0.11.

In this manner, the first arithmetic circuit 606 produces FA1 that corresponds to the relative minimum of the summation signal RFA for the first wobble mark 302 and FA2 that corresponds to the relative minimum of the summation signal RFA for the second wobble mark 303 from the input sampling values SD by performing interpolation.

The second arithmetic circuit 107 has the same configuration as that of the second arithmetic circuit 107 in FIG. 1. The second arithmetic circuit 107 uses FA1 and FA2 that are output from the first arithmetic circuit 606 to generate the tracking error signal TE that corresponds to a difference between the two values. That is, it calculates TE=FA1−FA2.

The processes 703 and 706 in FIG. 7 correspond to the functions of the minimum sampling value detecting portion, and the processes 704 and 707 correspond to the functions of the third estimating portion.

As described above, the tracking error signal detector 600 can function with the photodetector 103, the amplifier 104, the sampling circuit 105, the first arithmetic circuit 606, and the second arithmetic circuit 107.

The tracking control operation performed by the tracking control circuit 108, which receives the tracking error signal TE, and the driving circuit 109 is the same as that in Embodiment 1.

The tracking error signal detector 600 having the above configuration can eliminate the need for synchronization between the summation signal RFA of the amplifier 104 and the sample timing of the sampling circuit 105. Moreover, a high-accuracy tracking error signal TE can be obtained.

In particular, since the first arithmetic circuit 606 of this embodiment calculates FA1 or FA2 by using three sampling values, the operation can be simplified as compared with Embodiment 1, which leads to a decrease in the circuit size and an increase in the operation speed. Consequently, a tracking error signal detector with low cost and high reliability can be achieved.

EMBODIMENT 3

FIG. 8 shows the configuration of an optical disk apparatus including a tracking error signal detector 800 of Embodiment 3. In FIG. 8, the tracking error signal detector 800 has the same configuration as that in Embodiment 1 except for a second arithmetic circuit 807. Therefore, an explanation of the whole apparatus will not be repeated.

The second arithmetic circuit 807 uses values FA1 and FA2 that are output from a first arithmetic circuit 106 to calculate a difference TE1 between the two values (i.e., TE1←FA1−FA2). FA1 corresponds to the relative minimum of a summation signal RFA for a first wobble mark 302, and FA2 corresponds to the relative minimum of the summation signal RFA for a second wobble mark 303. The second arithmetic circuit 807 also receives sampling values SD of a sampling circuit 105 and selects either the difference TE1 or a tracking error signal that has been detected from the preceding servo area (hereinafter, referred to as "a tracking error signal in the last sampling") according to the sampling values SD so as to output as the tracking error signal TE.

For this purpose, the second arithmetic circuit 807 includes an output selecting portion, a comparing portion, and a portion for comparing sampling values between marks. Though these portions are not shown in the drawing, they perform the main operation among various operations to be described later. The output selecting portion selects and outputs either the difference TE1 or a tracking error signal in the last sampling according to the state of the sampling values. The comparing portion compares FA1 and FA2 from the first arithmetic circuit 106 with the sampling values SD at predetermined timing. The portion for comparing sampling values between marks compares the sampling values SD of the summation signal RFA in the vicinity of reproduction timing between the first wobble mark and the second wobble mark with a predetermined value.

The specific operation of the second arithmetic circuit 807 will be described below by referring to the operation flow in FIG. 9.

A process 901 operates to wait for a time for detecting the summation signal RFA of an amplifier 104 that corresponds to the clock mark 301, the first wobble mark 302, and the second wobble mark 303 in the servo area 304 shown in FIG. 3.

A process 902 operates to calculate the difference TE1 by subtracting FA2 from FA1, which are output from the first arithmetic circuit 106.

A process 903 operates to examine whether FA1 or FA2 is in a predetermined range. If the value falls outside the range, a process 911 is performed. If the value falls within the range, a process 904 is performed. The predetermined range is set based on the sizes of the clock mark 301, the first wobble mark 302 and the second wobble mark 303, and the shape and size of a light spot.

The process 904 operates to examine whether FA1 or FA2 is not more than α times the relative minimum of the summation signal RFA that corresponds to the clock mark 301. Here, α is a real number of not less than 1 and less than 1.5, and preferably 1. If the value is not more than α times the minimum, the process 911 is performed. If the value is more than α times the minimum, a process 905 is performed.

The process 905 operates to detect a value FM1 that corresponds to the maximum value of the summation signal RFA at timings between the first and second wobble marks 302, 303 that is detected by the first arithmetic circuit 106. If FM1 is not more than a predetermined value FM1R, the process 911 is performed. If FM1 is more than FM1R, a process 906 is performed. The predetermined value FM1R is β times the sampling value of the summation signal RFA that corresponds to a region where no mark is formed. Here, β is a positive real number of less than 1, and preferably 0.75.

The process 906 operates to examine whether the sampling values of the summation signal RFA that corresponds to the servo area 304 are in a predetermined range. If the sampling values fall outside the range, the process 911 is performed. If the sampling values fall within the range, a process 907 is performed. The predetermined range may be from +5% to +95% of the input dynamic range of a sampling portion for providing sampling values. This range can reduce the influence of saturation of an input signal.

The process 907 operates to select the next operation depending on whether tracking control operates normally. That is, if the tracking control is in operation, a process 908 is performed, and if not, a process 909 is performed. In other words, the process 907 selects the next operation according to the operating state of the tracking control, and the process 908 is performed only when the tracking control is in operation.

The process 908 operates to select the next operation depending on the directions in which FA1 and FA2 change (increase or decrease) from the values obtained in the last sampling, respectively. That is, if both FA1 and FA2 increase by a predetermined amount compared with their preceding values, the process 911 is performed. If both FA1 and FA2 decrease by a predetermined amount compared with their preceding values, the process 911 is performed. In other cases, the process 909 is performed.

The process 909 operates to output the difference TE1 as the tracking error signal TE.

The process 910 operates to store the value that has been output as the tracking error signal TE as a variable TE2.

The process 911 operates to output the variable TE2 as the tracking error signal TE. In other words, it outputs a tracking error signal in the last sampling as the tracking error signal TE. Here, the initial value of the variable TE2 is set to zero.

The process 904 corresponds to the function of the comparing portion, the processes 909, 910 and 911 correspond to the functions of the output selecting portion, and the process 905 corresponds to the function of the portion for comparing sampling values between marks.

The second arithmetic circuit 807 having the above configuration can minimize the influence on the tracking error signal TE even if any defect resides in the first and second wobble marks 302, 303 and their peripheries, thereby producing a high-quality tracking error signal TE. The reason for this will be described in detail below.

Figure 10A:
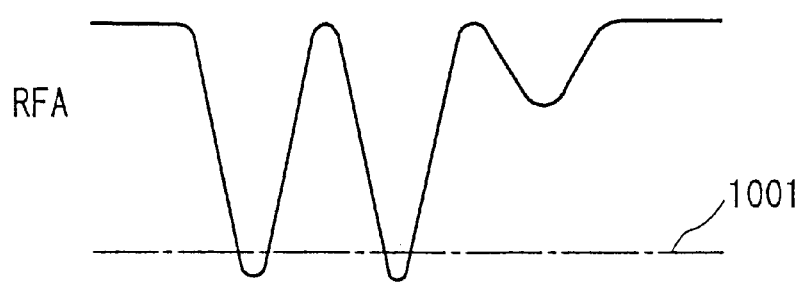
FIGS. 10A to 10C are waveform diagrams illustrating the operation of a tracking error signal detector of Embodiment 3.
Figure 10B:
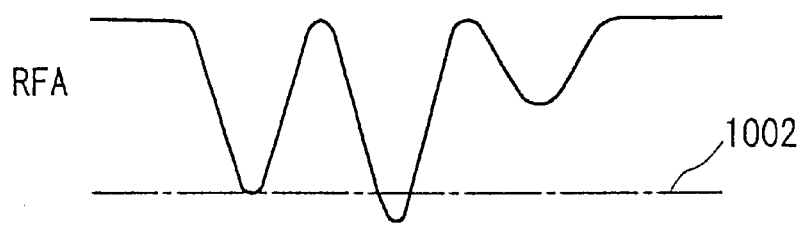
Figure 10C:
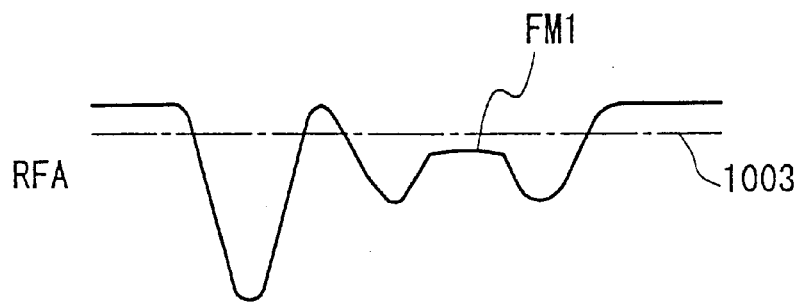

When a mark is formed on the optical recording medium 101, various summation signals RFA are obtained depending on the state of formation of the mark. FIGS. 10A to 10C show examples.

FIG. 10A illustrates an example of the waveform of the summation signal RFA when the clock mark 301 and the first wobble mark 302 are not formed normally. In this case, the process 903 judges that FA1, which corresponds to the relative minimum of the summation signal RFA for the first wobble mark 302, is smaller than the lower limit of a predetermined range (i.e., the lower limit 1001 in FIG. 10A), and thus the process 911 is performed. Accordingly, information of the first wobble mark 302 is not used, so that a favorable tracking error signal TE can be obtained.

FIG. 10B illustrates an example of the waveform of the summation signal RFA when the first wobble mark 302 is not formed normally. In this case, the process 904 judges that FA1, which corresponds to the relative minimum of the summation signal RFA for the first wobble mark 302, is smaller than the minimum of the summation signal RFA for the clock mark 301 (i.e., the threshold value 1002 in FIG. 10B), and thus the process 911 is performed. Accordingly, information of the first wobble mark 302 is not used, so that a favorable tracking error signal TE can be obtained.

FIG. 10C illustrates an example of the waveform of the summation signal RFA when defects reside in the peripheries of the first and second wobble marks 302, 303. In this case, the process 905 judges that FM1, which corresponds to the maximum value of the summation signal RFA at timings between the first and second wobble marks 302, 303 that is detected by the first arithmetic circuit 106, is smaller than the predetermined value FM1R (i.e., the level 1003 in FIG. 10C), and thus the process 911 is performed. Accordingly, information of the first wobble mark 302 is not used, so that a favorable tracking error signal TE can be obtained.

As described above, an appropriate output of the tracking error signal can be achieved by using a predetermined reference value for the sampling values SD. Therefore, a favorable tracking error signal TE can be obtained even if any defect resides in the marks on the optical recording medium 101 and their peripheries, as shown in FIGS. 10A to 10C.

Moreover, the second arithmetic circuit 807 selects and performs the process 908 in accordance with the operating state of the tracking control. That is, it makes a strict judgment on mark defects of the optical recording medium 101 during the tracking control operation. The reason for this is as follows: When the tracking control is under pulling in, a continuous signal is required even if the accuracy of a tracking error signal tends to be sacrificed. On the other hand, when the tracking control is in operation, some discontinuity in the tracking error signal is not a problem and the signal accuracy is required. These operations can improve the stability of normal operations while maintaining the pull-in characteristic of the tracking control.

The processes 903 to 906 also can be performed appropriately after the process 907. Thus, the operation to be selected can be changed depending on whether the tracking control is in operation or not, so that the tracking error signal detector 800 can function more properly.

As described above, the tracking error signal detector 800 of this embodiment can provide a tracking error signal with high reliability even if any defect resides in the clock mark, the wobble mark and their peripheries, resulting in a tracking error system with high reliability.

EMBODIMENT 4

FIG. 11 shows the configuration of an optical disk apparatus including a tracking error signal detector 1100 of Embodiment 4. In FIG. 11, the optical disk apparatus has the same configuration as that in Embodiment 1 except for an optical recording medium 1101, a first arithmetic circuit 1106 and a second arithmetic circuit 1107. Therefore, an explanation of the whole apparatus will not be repeated.

Figure 12:
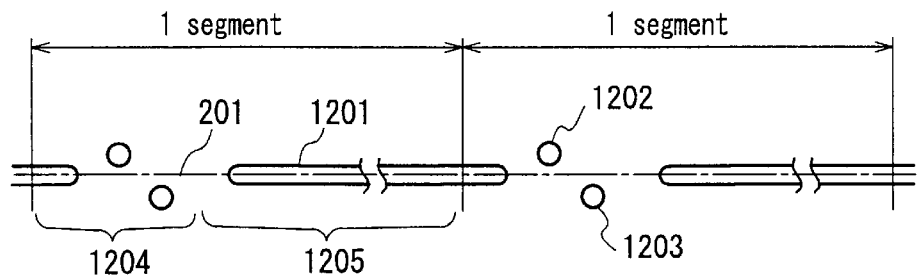
FIG. 12 is a diagram showing the configuration of segments of an optical recording medium with which a tracking error signal detector of Embodiment 4 is used.

FIG. 12 shows the arrangement of marks in each segment of the optical recording medium 1101. In FIG. 12, a servo area 1204 is formed in the beginning of a segment and a data area 1205 is formed in the rest. The data area 1205 is provided with a groove 1201. A portion of the groove 1201 in the data area 1205 is extended to the servo area 1204, and then a first wobble mark 1202 and a second wobble mark 1202 are arranged. A track centerline 201 is an imaginary line, along which a light spot should travel when data recorded on the optical recording medium 1101 are read. The groove 1201 in the data area 1205 is formed on the track centerline 201. The edge of the groove 1201 is used to generate a synchronizing clock signal for reproducing the wobble marks 1202, 1203 and information recorded on the data area 1205. The first and second wobble marks 1202, 1203 are used to detect a tracking error signal TE and displaced from each other on the opposite sides of the track centerline 201.

The following is an explanation of the operations for providing a high-accuracy tracking error signal TE from sampling values SD with the first and second arithmetic circuits 1106, 1107 in FIG. 11.

Figure 13:
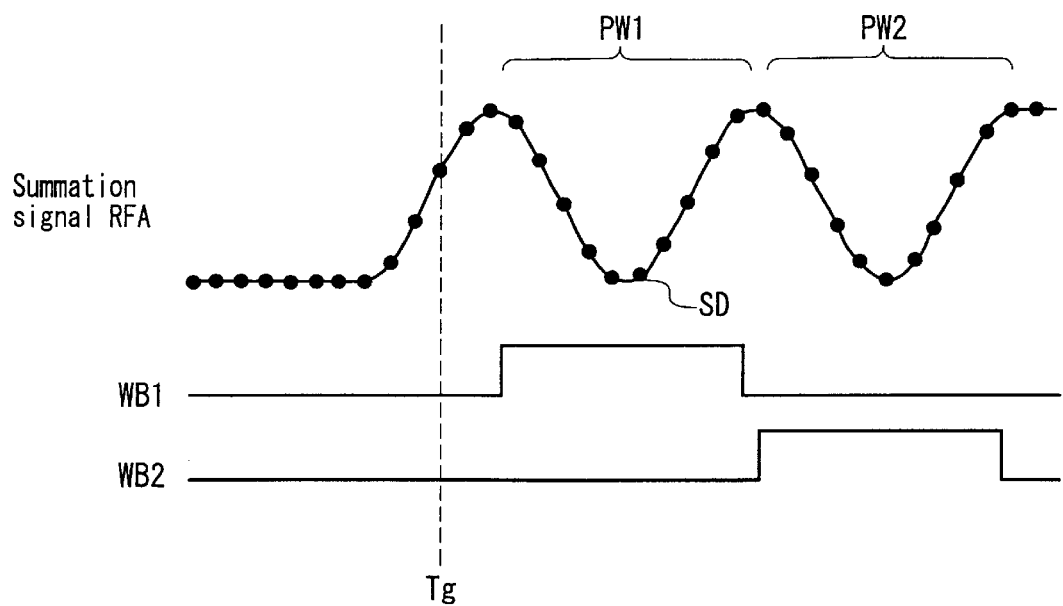
FIG. 13 is a waveform diagram illustrating the operation of a tracking error signal detector of Embodiment 4.

The sampling values SD from a sampling circuit 105 are input to the first arithmetic circuit 1106. FIG. 13 shows the relationship between a summation signal RFA of an amplifier 104 and the sampling values SD. The sampling circuit 105 samples the summation signal RFA with a predetermined sampling clock CLK to produce the sampling values SD. In FIG. 13, the sampling values SD in a section PW1 correspond to the first wobble mark 1202, and those in a section PW2 correspond to the second wobble mark 1203. As can be seen from FIG. 13, a minimum of the sampling values SD in the section PW1 differs from the relative minimum of the summation signal RFA. On the other hand, a minimum of the sampling values SD in the section PW2 corresponds to the relative minimum of the summation signal RFA. Therefore, calculating the tracking error signal TE from the two sampling values SD causes a large error.

Figure 14:
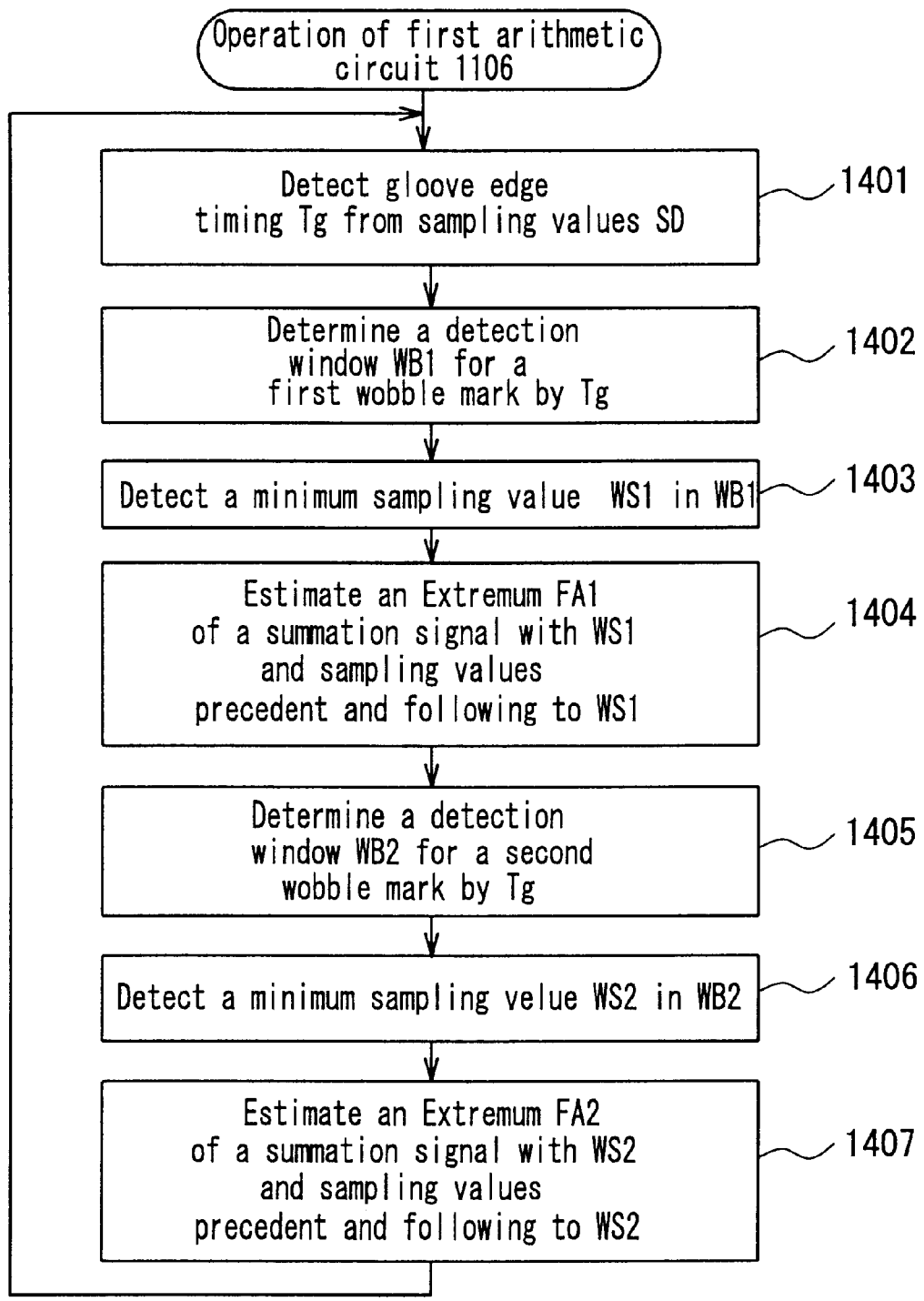
FIG. 14 is a flow chart illustrating the operation of a first arithmetic circuit that constitutes a tracking error signal detector of Embodiment 4.

The first arithmetic circuit 1106 detects two values, FA1 and FA2, from the input sampling values SD. FA1 corresponds to the relative minimum of the summation signal RFA for the first wobble mark 1202, and FA2 corresponds to the relative minimum of the summation signal RFA for the second wobble mark 1203. FIG. 14 shows a specific operation flow of the first arithmetic circuit 1106. The specific operation of the first arithmetic circuit 1106 will be described below by referring to FIG. 14.

A process 1401 in FIG. 14 operates to detect an edge timing Tg (see FIG. 13) of the groove 1201 in the servo area 1204 from the sampling values SD. The detection is performed in the following manner. Since no mark is present in a predetermined section ahead of the edge of the groove 1201 on the optical recording medium 1101, the summation signal RFA is kept substantially constant during a predetermined period of time. When a light spot passes on the edge of the groove 1201, the summation signal RFA changes greatly. Therefore, the summation signal RFA that corresponds to the edge of the groove 1201 can be detected by using this change, making it possible to detect the groove edge timing Tg.

A process 1402 operates to determine a detection window WB1 in the vicinity of reproduction timing of the first wobble mark 1202 by using the groove edge timing Tg (see the signal WB1 in FIG. 13). The detection window WB1 may be set so as to include the relative minimum of the summation signal RFA that corresponds to the first wobble mark 1202.

A process 1403 operates to detect a minimum WS1 of the sampling values SD in the detection window WB1. The minimum WS1 can be detected easily by a comparison operation.

A process 1404 operates to calculate the extremum FA1 of the summation signal RFA by using the sampling values SD precedent and following to the minimum WS1. Specifically, FA1 is given by $$FA1 = WS1 - k \times ABS(WS1M1 - WS1P1)$$

where ABS(x) is the absolute value of x, WS1M1 and WS1P1 are respective sampling values immediately before and after the minimum WS1, and k is a predetermined constant. Here, k is a positive real number of not more than 0.3, and preferably, 0.11.

A process 1405 operates to determine a detection window WB2 in the vicinity of reproduction timing of the second wobble mark 1203 by using the groove edge timing Tg. The detection window WB2 may be set so as to include the relative minimum of the summation signal RFA that corresponds to the second wobble mark 1203.

A process 1406 operates to detect a minimum WS2 of the sampling values SD in the detection window WB2. The minimum WS2 can be detected easily by a comparison operation.

A process 1407 operates to calculate the extremum FA2 of the summation signal RFA by using respective sampling values SD precedent and following to the minimum WS2. Specifically, FA2 is given by $$FA2 = WS2 - k \times ABS(WS2M1 - WS2P1)$$

where ABS(x) is the absolute value of x, WS2M1 and WS2P1 are respective sampling values immediately before and after the minimum WS2, and k is a predetermined constant. Here, k is a positive real number of not more than 0.2, and preferably 0.11.

In this manner, the first arithmetic circuit 1106 detects FA1 that corresponds to the relative minimum of the summation signal RFA for the first wobble mark 1202 and FA2 that corresponds to the relative minimum of the summation signal RFA for the second wobble mark 1203 from the input sampling values SD.

The second arithmetic circuit 1107 uses FA1 and FA2 to calculate a difference TE1 between the two values. It also receives the sampling values SD output from the sampling circuit 105 and selects either the difference TE1 or a tracking error signal in the last sampling according to the sampling values SD so as to output as the tracking error signal TE.

Figure 15:
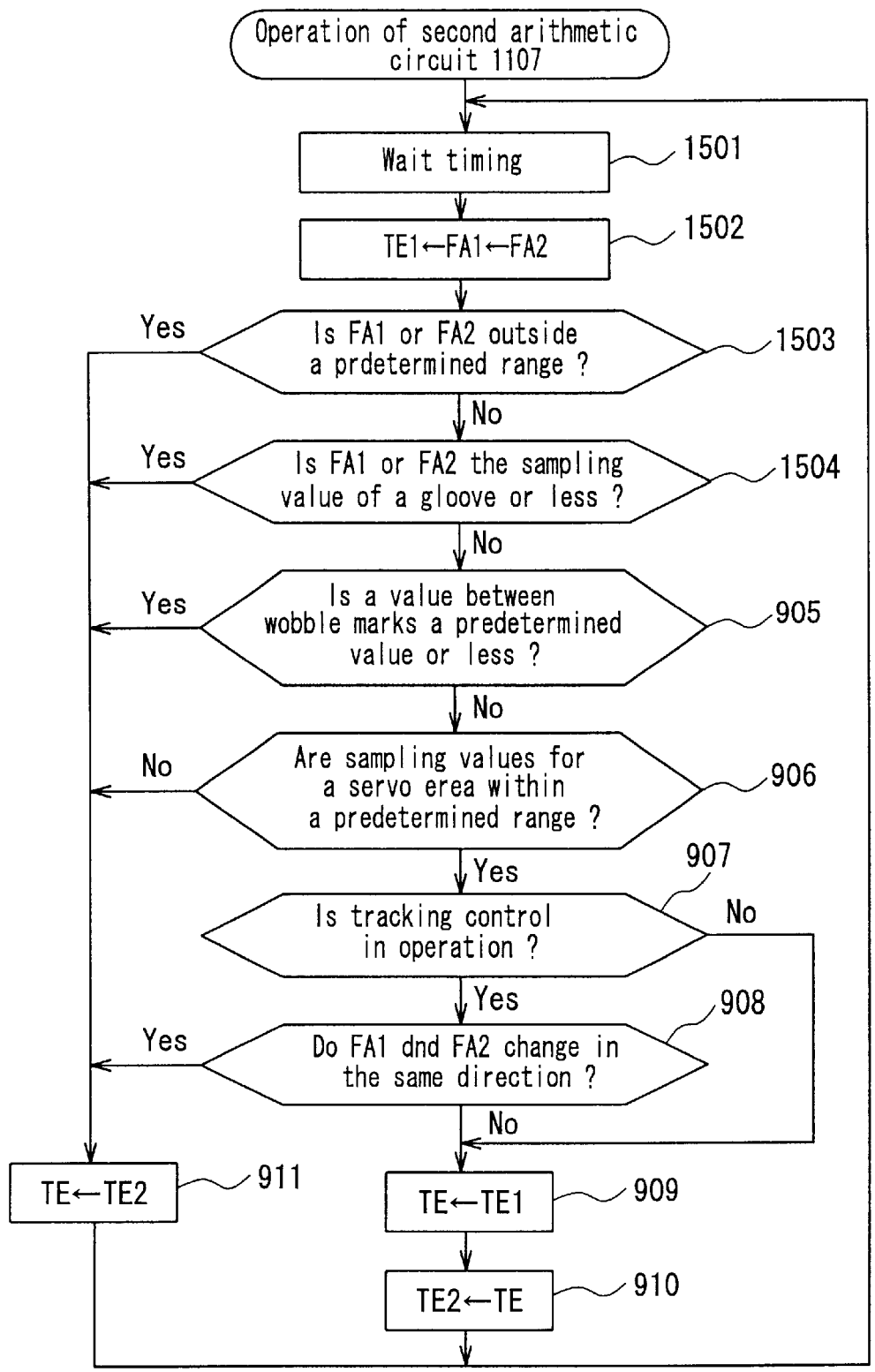
FIG. 15 is a flow chart illustrating the operation of a second arithmetic circuit that constitutes a tracking error signal detector of Embodiment 4.

FIG. 15 shows an operation flow of the second arithmetic circuit 1107. This operation flow includes the identical processes to those in FIG. 9, and thus such processes are denoted by the same reference numerals. The following is an explanation of the specific operation of the second arithmetic circuit 1107.

A process 1501 operates to wait for a time for detecting the summation signal RFA that corresponds to the first wobble mark 1202 and the second wobble mark 1203 in the servo area 1204. Then, a process 1502 is performed.

The process 1502 operates to calculate the difference TE1 by subtracting FA2 from FA1, which are output from the first arithmetic circuit 1106. That is, it calculates TE1←FA1−FA2.

A process 1503 operates to examine whether FA1 or FA2 is in a predetermined range. If the value falls outside the range, a process 911 is performed. If the value falls within the range, a process 1504 is performed. The predetermined range is set based on the shape of the groove 1201, the sizes of the first and second wobble marks 1202, 1203, and the shape and size of a light spot.

A process 1504 operates to examine whether FA1 or FA2 is smaller than a times the minimum of the summation signal RFA that corresponds to the groove 1201. Here, α is a real number of not less than 1 and less than 2.5, and preferably 1.5. If the value is smaller than α times the minimum, the process 911 is performed. If the value is not less than α times the minimum, a process 905 is performed.

Figure 9:
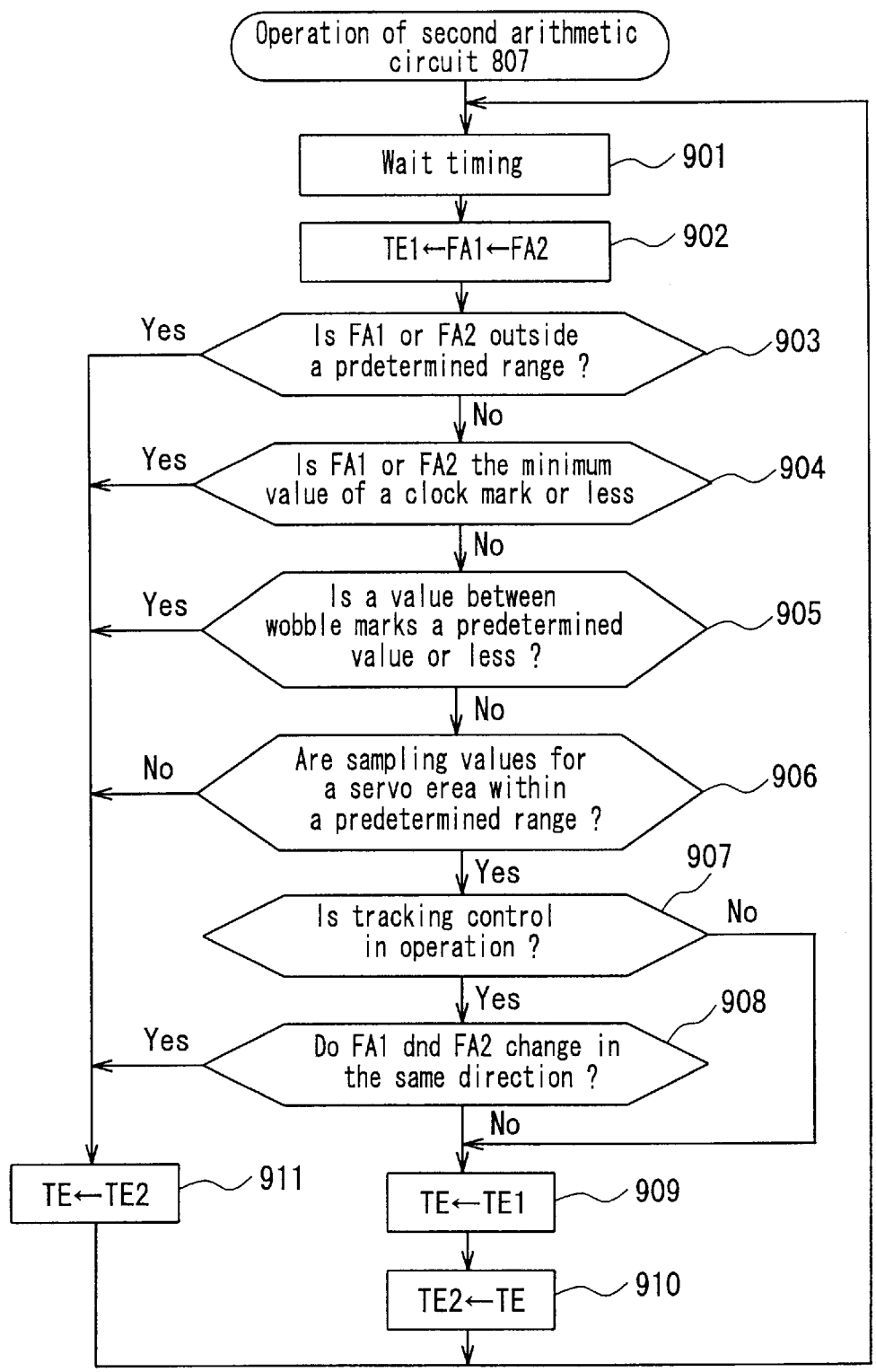
FIG. 9 is a flow chart illustrating the operation of a second arithmetic circuit that constitutes a tracking error signal detector of Embodiment 3.

The next processes 905 to 911 are the same as those in FIG. 9, and thus the explanation will not be repeated.

The second arithmetic circuit 1107 having the above configuration can minimize the influence on the tracking error signal TE even if any defect resides in the first and second wobble marks 1202, 1203 and their peripheries, thereby providing a high-quality tracking error signal TE. The reason for this will be described below.

When a mark is formed on the optical recording medium 1101, various summation signal RFA are obtained depending on the state of formation of the mark. FIG. 16 illustrates an example of the waveform of the summation signal RFA when the first wobble mark 1202 is not formed normally. In this case, the process 1504 judges that FA1, which corresponds to the relative minimum of the summation signal RFA for the first wobble mark 1202 (i.e., the portion represented by 1602 in FIG. 16), is sufficiently smaller than a sampling value, which corresponds to the relative minimum of the summation signal RFA for the groove 1201 (i.e., the threshold value 1601 in FIG. 16), and thus the process 911 is performed. Accordingly, information of the first wobble mark 1202 is not used, so that a favorable tracking error signal TE can be obtained even if any defect resides in the marks on the optical recording medium 1101 and their peripheries, as shown in FIG. 16. In this manner, an appropriate output of the tracking error signal can be achieved by using the predetermined sampling values.

As described above, the tracking error signal detector 1100 of this embodiment can provide a tracking error system with high reliability.

In each of the above embodiments, the first and second arithmetic circuits or the like may be formed as hardware, or the functions shown in the operation flow charts may be performed by software that runs on a computer.

INDUSTRIAL APPLICABILITY

According to the present invention, the extremum of each reproduced wobble mark in an optical disk apparatus is detected by operations with the sampling values of a summation signal in the vicinity of the wobble mark. Therefore, even if sampling is performed at asynchronous timing to the summation signal, a high-accuracy tracking error signal can be obtained.

Moreover, an appropriate output of the tracking error signal is achieved by using a predetermined reference value for the sampling values, thus generating a tracking error signal that is hardly affected by mark defects.

Thus, a tracking error signal detector of the present invention can provide tracking control with high reliability and high accuracy.

What is claimed is:

1. A tacking error signal detector comprising:
   a photodetector for detecting reflected light from an optical recording medium comprising a servo area provided with a first wobble mark and a second wobble mark;
   an amplifier for producing a summation signal of the reflected light from a detection signal of the photodetector;
   a sampling portion for sampling the summation signal;
   a first arithmetic portion for calculating extremum of the summation signal in the vicinity of reproduction timing for each of the first wobble mark and the second wobble mark from sampling values produced by the sampling portion so as to produce a first extremum and a second extremum; and
   a second arithmetic portion for producing a tacking error signal that corresponds to a difference between the first extremum and the second extremum;
   wherein the first arithmetic portion comprises
   a maximum/minimum sampling value detecting portion that produces a maximum/minimum of the sampling values in the vicinity of reproduction timing for each of the first wobble mark and the second wobble mark, a first estimating portion that estimates a timing of a relative maximum/minimum of the summation signal in the vicinity of reproduction timing for each of the first wobble mark and the second wobble mark by using the maximum/minimum sampling value and its preceding and following sampling values; and a second estimating portion that estimates a relative maximum/minimum of the summation signal in the vicinity of reproduction timing for each of the first wobble mark and the second wobble mark by using the maximum/minimum sampling value, its preceding and following sampling values, and the timing of the relative maximum/minimum output from the first estimating portion.

2. A tracking error signal detector comprising:

a photodetector for detecting reflected light from an optical recording medium comprising a servo area provided with a first wobble mark and a second wobble mark;

an amplifier for producing a summation signal of the reflected light from a detection signal of the photodetector;

a sampling portion for sampling the summation signal;

a first arithmetic portion for calculating extremum of the summation signal in the vicinity of reproduction timing for each of the first wobble mark and the second wobble mark from sampling values produced by the sampling portion so as to produce a first extremum and a second extremum; and a second arithmetic portion for producing a tracking error signal that corresponds to a difference between the first extremum and the second extremum;

wherein the first arithmetic portion comprises a maximum/minimum sampling value detecting portion that produces a maximum/minimum of the sampling values in the vicinity of reproduction timing for each of the first wobble mark and the second wobble mark; and a third estimating portion that estimates a relative maximum/minimum of the summation signal in the vicinity of reproduction timing for each of the first wobble mark and the second wobble mark by using the maximum/minimum sampling value and its preceding and following sampling values.

3. A tracking error signal detector comprising:

a photodetector far detecting reflected light from an optical recording medium comprising a servo area provided with a first wobble mark and a second wobble mark;

an amplifier for producing a summation signal of the reflected light from a detection signal of the photodetector;

a sampling portion for sampling the summation signal;

a first arithmetic portion for calculating extremum of the summation signal in the vicinity of reproduction timing far each of the first wobble mark and the second wobble mark from sampling values produced by the sampling portion so as to produce a first extremum and a second extremum; and a second arithmetic portion for producing a tracking error signal that corresponds to a difference between the first extremum and the second extremum;

wherein the second arithmetic portion comprises an output selecting portion that selects one of a value corresponding to the difference between the first extremum and the second extremum and a tracking error signal detected from the preceding servo area in accordance with a state of the sampling values so as to output the tracking error signal.

4. A tracking error signal detector comprising:

a photodetector for detecting reflected light from an optical recording medium comprising a servo area provided with a first wobble mark and a second wobble mark;

an amplifier for producing a summation signal of the reflected light from a detection signal of the photodetector;

a sampling portion for sampling the summation signal;

a first arithmetic portion for calculating extremum of the summation signal in the vicinity of reproduction timing for each of the first wobble mark and the second wobble mark from sampling values produced by the sampling portion so as to produce a first extremum and a second extremum; and a second arithmetic portion for producing a tracking error signal that corresponds to a difference between the first extremum and the second extremum;

wherein the second arithmetic portion comprises a comparing portion that compares the first extremum and the second extrermum with a sampling value at predetermined timing, and an output selecting portion that selects one of a value corresponding to the difference between the first extremum and the second extremum and a tracking error signal detected from the preceding servo area in accordance with the comparison result of the comparing portion so as to output the tracking error signal.

5. A tracking error signal detector comprising:

a photodetector for detecting reflected light from an optical recording medium comprising a servo area provided with a first wobble mark and a second wobble mark;

an amplifier for producing a summation signal of the reflected light from a detection signal of the photodetector;

a sample portion for sampling the summation signal;

a first arithmetic portion for calculating extremum of the summation signal in the vicinity of reproduction timing for each of the first wobble mark and the second wobble mark from sampling values produced by the sampling portion so as to produce a first extremum and a second extremum; and a second arithmetic portion for producing a tracking error signal that corresponds to a difference between the first extremum and the second extremum;

wherein the second arithmetic portion comprises a portion for comparing sampling values between marks that compares the sampling values of the summation signal in the vicinity of reproduction timing between the first wobble mark and the second wobble mark with a predetermined value, and an output selecting portion that selects one of a value corresponding to the difference between the first extremism and the second extremism and a tracking error signal detected from the preceding servo area in accordance with the comparison result of the portion for comparing sampling values between marks so as to output the tracking error signal.

6. The tracking error signal detector according claim 3, wherein the output selecting portion changes a selecting/ outputting operation in accordance with an operating state of tracking control.

7. The tracking error signal detector according to claim 6, wherein the second arithmetic portion selects one of a value corresponding to the difference between the first extremum and the second extremum and a tracking error signal detected from the preceding servo area in accordance with directions in which the first extremum and the second extremum change during the tracking control operation so as to output the tracking error signal.

8. The tracking error signal detector according claim 4, wherein the output selecting portion changes a selecting/outputting operation in accordance with an operating state of tracking control.

9. The tracking error signal detector according to claim 8, wherein the second arithmetic portion selects one of a value corresponding to the difference between the first extremum and the second extremum and a tracking error signal detected from the preceding servo area in accordance with directions in which the first extrermum and the second extremum change during the tracking control operation so as to output the tracking error signal.

10. The tracking error signal detector according claim 5, wherein the output selecting portion changes a selecting/outputting operation in accordance with an operating state of tracking control.

11. The tracking error signal detector according to claim 10, wherein the second arithmetic portion selects one of a value corresponding to the difference between the first extremum and the second extremum and a tracking error signal detected from the preceding servo area in accordance with directions in which the first extremum and the second extremum change during the tracking control operation so as to output the tacking error signal.

* * * * *